(12) United States Patent
Mayberry et al.

(10) Patent No.: US 11,417,015 B2
(45) Date of Patent: Aug. 16, 2022

(54) DECENTRALIZED LOCATION DETERMINATION SYSTEMS AND METHODS

(71) Applicant: Ford Global Technologies, LLC, Dearborn, MI (US)

(72) Inventors: Scott Mayberry, East Point, GA (US); Raj Sohmshetty, Canton, MI (US); Sam Hoff, Hazel Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 17/075,022

(22) Filed: Oct. 20, 2020

(65) Prior Publication Data

US 2022/0122283 A1 Apr. 21, 2022

(51) Int. Cl.
G06T 7/73 (2017.01)
G06K 7/14 (2006.01)

(52) U.S. Cl.
CPC .............. G06T 7/73 (2017.01); G06K 7/1417 (2013.01); *G06T 2207/30204* (2013.01)

(58) Field of Classification Search
CPC ............ G06T 7/73; G06T 2207/30204; G06K 7/1417
See application file for complete search history.

(56) References Cited

U.S. PATENT DOCUMENTS 10,504,230 B1 * 12/2019 Stahl ................ G06K 19/06037
10,699,147 B2 * 6/2020 Gong ......................... G06T 7/73
2019/0156086 A1 * 5/2019 Plummer ............. G06K 7/1413
2019/0278288 A1 9/2019 Xiong et al.
2020/0364900 A1 * 11/2020 Bradski ..................... G06T 7/75

FOREIGN PATENT DOCUMENTS

| CN | 105388899 | 1/2018 |
| CN | 109189073 | 1/2019 |
| CN | 108592906 | 2/2020 |

OTHER PUBLICATIONS

Olson ("AprilTag: A robust and flexible visual fiducial system", Proceedings of the IEEE International Conference on Robotics and Automation (ICRA), 2011).*
Feng, et al., Towards Autonomous Robotic In-Situ Assembly on Unstructured Construction Sites Using Monocular Vision, 2014, pp. 1-8, from The 31st International Symposium on Automation and Robotics in Construction and Mining (ISARC).

* cited by examiner

*Primary Examiner* — Seung H Lee
(74) *Attorney, Agent, or Firm* — Burris Law, PLLC (57) ABSTRACT

A mapping system for an environment includes an image sensor configured to generate image data of the environment. The mapping system includes a fixed tag including position indicia, where the position indicia identifies a predefined position coordinate of the fixed tag. The mapping system includes an entity tag including entity indicia, where the entity indicia identifies an entity associated with the entity tag. The mapping system includes a controller configured to determine a position coordinate of the entity tag based on the image data, where the image data includes the position indicia and the entity indicia.

19 Claims, 3 Drawing Sheets

DECENTRALIZED LOCATION DETERMINATION SYSTEMS AND METHODS

FIELD

The present disclosure relates to a system and/or method for locating position and/or destination in a manufacturing environment.

BACKGROUND

The statements in this section merely provide background information related to the present disclosure and may not constitute prior art.

In a manufacturing environment, autonomous systems are utilized to perform various manufacturing processes. To effectively perform the manufacturing processes, the autonomous systems utilize location data from global navigation satellite system (GNSS) sensors to identity a destination, its global position coordinates, and a path between the global position coordinates and the destination. However, GNSS sensors may be inaccurate in a manufacturing environment and, more particularly, indoor manufacturing environments. These issues associated with GNSS sensors, among other issues, are addressed by the present disclosure.

SUMMARY

This section provides a general summary of the disclosure and is not a comprehensive disclosure of its full scope or all of its features.

The present disclosure provides a mapping system for an environment includes an image sensor configured to generate image data of the environment. The mapping system includes a fixed tag including position indicia, where the position indicia identifies a predefined position coordinate of the fixed tag. The mapping system includes an entity tag including entity indicia, where the entity indicia identifies an entity associated with the entity tag. The mapping system includes a controller configured to determine a position coordinate of the entity tag based on the image data, where the image data includes the position indicia and the entity indicia.

In some forms, the fixed tag is disposed on a fixed object within the environment.

In some forms, the entity tag is disposed on an object associated with the entity and the object is moveable within the environment.

In some forms, the controller is further configured to determine a first image-based distance between the image sensor and the fixed tag based on the image data, and the controller is further configured to determine a second image-based distance between the image sensor and the entity tag based on the image data. In some forms, the position coordinate of the entity tag is further based on the first image-based distance, the second image-based distance, and the predefined position coordinate of the fixed tag.

In some forms, the first image-based distance is determined based on a comparison of the fixed tag to one or more reference geometries of the fixed tag, and the one or more reference geometries is a reference size of the fixed tag, a reference angle of the fixed tag, or a combination thereof.

In some forms, the second image-based distance is determined based on a comparison of the entity tag to one or more reference geometries of the entity tag, and the one or more reference geometries is a reference size of the entity tag, a reference angle of the entity tag, or a combination thereof.

In some forms, the controller is further configured to determine the first image-based distance and the second image-based distance based on a pixel density of the image sensor, a focal length of the image sensor, a height of the image sensor, a width of the image sensor, a geometry of the image sensor, or a combination thereof.

In some forms, the controller is further configured to broadcast the position coordinate of the entity tag to a database that stores the position coordinate corresponding to the entity tag to identify a location of the entity within the environment.

In some forms, the mapping system further includes a plurality of the fixed tags, where each fixed tag of the plurality of fixed tags identifies a unique predefined position coordinate, and where the plurality of fixed tags is distributed throughout the environment.

In some forms, the fixed tag and the entity tag are fiducial markers.

In some forms, the fixed tag is an AprilTag, and the position indicia is a two-dimensional barcode.

In some forms, the controller is further configured to decode the two-dimensional barcode to identify the predefined position coordinate of the AprilTag.

In some forms, the entity tag is an AprilTag, and the entity indicia is a two-dimensional barcode.

In some forms, the image sensor is disposed on one of a fixed object and a moveable object within the environment.

The present disclosure also provides a mapping method for mapping an environment, where the environment includes an image sensor configured to generate image data, and where the image data includes a fixed tag and an entity tag of the environment. The method includes identifying position indicia of the fixed tag, where the position indicia identifies a predefined position coordinate of the fixed tag. The method includes identifying entity indicia of the entity tag, where the entity indicia identifies an entity associated with the entity tag. The method includes determining a position coordinate of the entity tag based on the predefined position coordinate of the fixed tag and the image data.

In some forms, the method further includes determining a first image-based distance between the image sensor and the fixed tag based on the image data. In some forms, the method further includes determining a second image-based distance between the image sensor and the entity tag based on the image data, where the position coordinate of the entity tag is further based on the first image-based distance, the second image-based distance, and the predefined position coordinate of the fixed tag.

In some forms, the first image-based distance is determined based on a comparison of the fixed tag to one or more reference geometries of the fixed tag, and the one or more reference geometries is a reference size of the fixed tag, a reference angle of the fixed tag, or a combination thereof.

In some forms, the second image-based distance is determined based on a comparison of the entity tag to one or more reference geometries of the entity tag, and the one or more reference geometries is a reference size of the entity tag, a reference angle of the entity tag, or a combination thereof.

The present disclosure also provides a mapping method for mapping an environment, where the environment includes an image sensor configured to generate image data, and where the image data includes a fixed tag and an entity tag of the environment. The method includes identifying position indicia of the fixed tag, where the position indicia identifies a predefined position coordinate of the fixed tag.

The method includes identifying entity indicia of the entity tag, where the entity indicia identifies an entity in the environment. The method includes determining one or more image-based distances between the image sensor and at least one of the entity tag and the fixed tag. The method includes determining a position coordinate of the entity tag based on the one or more image-based distances and the predefined position coordinate of the fixed tag.

In some forms, the one or more image-based distances includes a first image-based distance between the image sensor and the fixed tag, and the one or more image-based distances includes a second image-based distance between the image sensor and the entity tag. In some forms, the position coordinate of the entity tag is further based on the first image-based distance and the second image-based distance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a mapping system for a manufacturing environment that includes various entities (e.g., mobile robots, mobile workstations, fixed systems/components, locations in the manufacturing environment, among others). The mapping system dynamically determines and updates the location coordinates of various systems and components of the environment based on fixed tags that identify predefined position coordinates and entity tags that identify the entity.

As an example, the autonomous systems navigate within the manufacturing environment and detect, using one or more onboard image sensors, a fixed tag and an entity tag. A controller of the autonomous system identifies the predefined position coordinates and the entity associated with the entity tag based on the indicia of the fixed tag and entity tag, respectively. The controller then determines a position coordinate of the entity tag based on the predefined position coordinates and one or more image-based distances between the onboard image sensor, the fixed tag, and the entity tag. Accordingly, the position coordinates of various entities in the manufacturing environment are dynamically determined and may be updated in a decentralized manner and without the use of GNSS sensors. Furthermore, as new entities are incorporated into the manufacturing environment, position coordinates of the new entities can be dynamically determined by attaching an entity tag thereon and without the use of GNSS sensors. It should be readily understood that the mapping system of the present disclosure addresses other issues and should not be limited to the examples provided herein.

Figure 1:
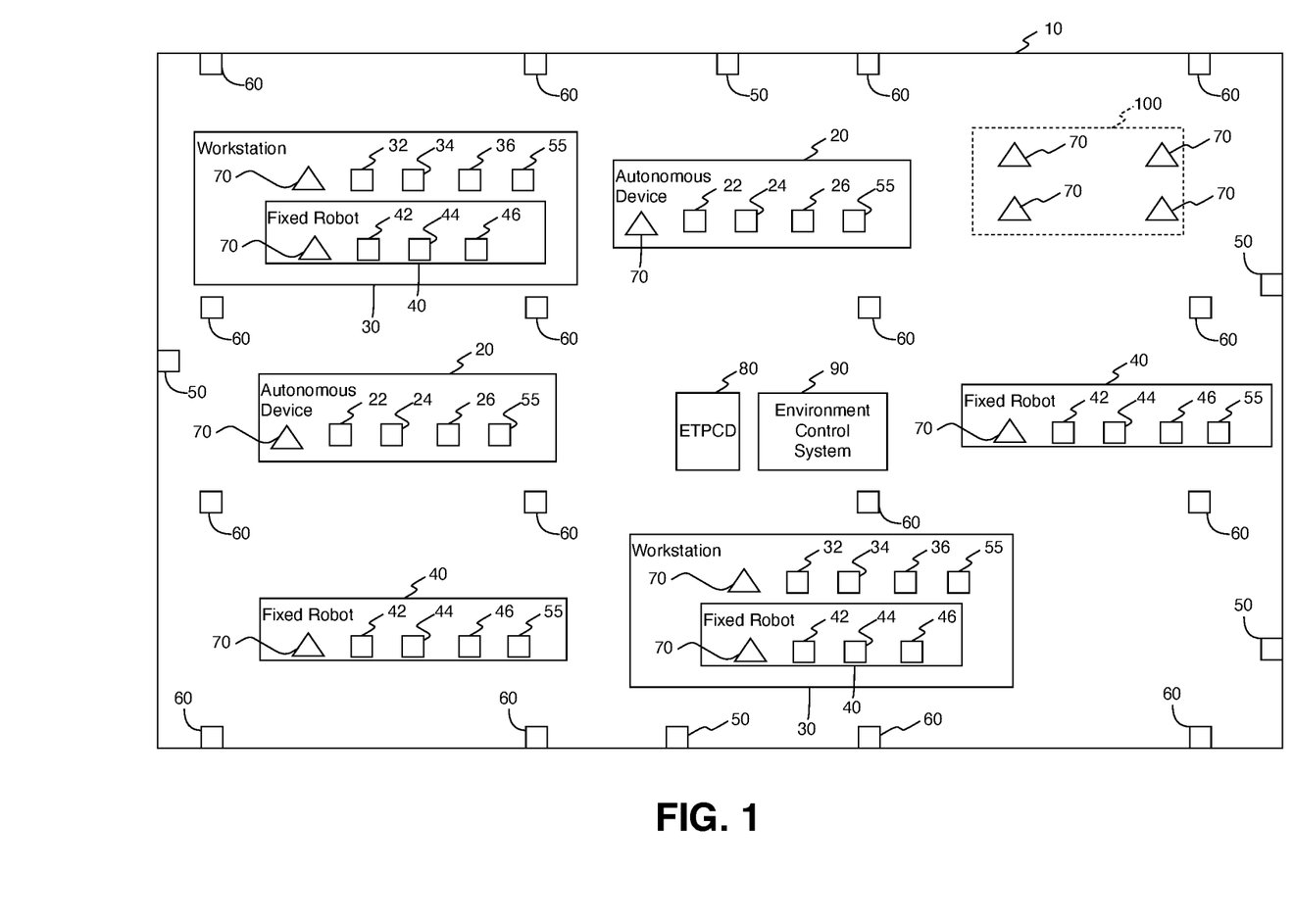
FIG. 1 illustrates a manufacturing environment having autonomous systems and an environment control system in accordance with the teachings of the present disclosure.

Referring to FIG. 1, a manufacturing environment 10 for manufacturing a component (e.g., a vehicle) is provided. The manufacturing environment 10 generally includes autonomous devices 20, workstations 30, fixed robots 40, infrastructure sensors 50, onboard image sensors 55, fixed tags 60, entity tags 70, an entity tag position coordinate database (ETPCD) 80, and an environment control system 90. In the following, the infrastructure sensors 50 and the onboard imaging sensors 55 are collectively referred to as "imaging sensors 50 and/or 55". While the ETPCD 80 and the environment control system 90 are illustrated as part of the manufacturing environment 10, it should be understood that the ETPCD 80 and/or the environment control system 90 may be positioned remotely from the manufacturing environment 10 in other forms. In one form, the autonomous devices 20, the workstations 30, the fixed robots 40, the ETPCD 80, and/or the environment control system 90 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the autonomous devices 20 are partially or fully-autonomous and are configured to autonomously move to various locations of the manufacturing environment 10, as instructed by the environment control system 90. As an example, the autonomous devices 20 include, but are not limited to, mobile robots, drones, and/or automated guided vehicles, among other autonomous devices. To autonomously move itself, the autonomous devices 20 include a control system 22 to control various movement systems of the autonomous device 20 (e.g., propulsion systems, steering systems, and/or brake systems) via actuators 24 and based on one or more autonomous navigation sensors 26 (e.g., a GNSS sensor, a local position sensor, among others) and image data from the imaging sensors 50 and/or 55.

In one form, the workstations 30 include one or more elements for supporting and/or securing external components (e.g., a workpiece, the fixed robot 40, among others) and/or operators thereon. As an example, the workstations 30 include a platform for supporting an operator that performs an operation on the workpiece as the workstations 30 autonomously navigate throughout the manufacturing environment 10. As another example, the workstations 30 include a fastening mechanism that secures a workpiece and/or the fixed robot 40 to the workstations 30. Example fastening mechanisms include, but are not limited to, a magnetic fastening assembly, a vacuum fastening assembly, an adhesive fastening assembly, or a combination thereof.

In one form, the workstations 30 are partially or fully-autonomous and are configured to autonomously move to various locations of the manufacturing environment 10 (e.g., an automated guided vehicle), as instructed by the environment control system 90. To autonomously move itself, the workstations 30 include a control system 32 to control various movement systems of the workstation 30 (e.g., propulsion systems, steering systems, and/or brake systems)

via actuators 34 and based on one or more autonomous navigation sensors 36 (e.g., a GNSS sensor, a local position sensor, among others) and image data from the imaging sensors 50 and/or 55. It should be understood that the workstations 30 may be fixed within the manufacturing environment 10 in other forms.

In one form, the fixed robots 40 (e.g., industrial robots) are configured to perform an automated operation on a workpiece. The fixed robots 40 may be confined to a given area in the manufacturing environment 10. As an example, the fixed robots 40 may be provided in an uncaged area having no fence or other containment-like structure for confining the movement of the fixed robot 40. As another example, the fixed robots 40 may be provided in a caged area having a fence or other containment-like structure for confining the movement of the fixed robot 40. Furthermore, the fixed robots 40 may include a control system 42 configured to operate actuators 44 to control the motion of one or more robotic links (e.g., robotic arms) attached thereto and thereby perform one or more automated operations defined in a robot task database 46.

In one form, the infrastructure sensors 50 and the onboard imaging sensors 55 are imaging sensors that provide image data of the manufacturing environment 10 to at least one of the control systems 22, 32, 42 of the autonomous devices 20, the workstations 30, and/or the fixed robots 40, respectively. More particularly, the imaging sensors 50 and/or 55 are configured to obtain image data of the fixed tags 60 and the entity tags 70. In one form, the infrastructure sensors 50 are provided on an infrastructure element within the manufacturing environment 10, such as, but not limited to: a tower, a light pole, a building, a sign, among other fixed elements of the manufacturing environment 10. In one form, the onboard image sensors 55 are disposed on the autonomous devices 20, the workstations 30, and/or the fixed robots 40. The imaging sensors 50 and/or 55 may include, but are not limited to: a two-dimensional (2D) camera, a three-dimensional (3D) camera, an infrared sensor, a radar scanner, a laser scanner, a light detection and ranging (LIDAR) sensor, an ultrasonic sensor, among others. As described below in further detail, the control systems 22, 32, 42 are configured to determine a position coordinate of a detected entity tag 70 and/or associated entity based on the image data obtained from the imaging sensors 50 and/or 55.

In one form, the fixed tags 60 include position indicia (e.g., images and/or text) that uniquely identifies a predefined position coordinate within the manufacturing environment 10. In one form, the fixed tags 60 are fiducial markers that uniquely identify predefined position coordinates. As an example, the fixed tags 60 are AprilTags (i.e., 2D barcodes having 4-12 bits) and/or quick response (QR) tags that each include a unique 2D barcode, and each 2D barcode is associated with a predefined position coordinate. In one form, the fixed tags 60 include text of the predefined position coordinates. It should be understood that the fixed tags 60 may be implemented by various others fiducial markers in other forms and are not limited to the examples described herein.

In one form, the fixed tags 60 are disposed on fixed infrastructure elements within the manufacturing environment 10, such as, but not limited to: the infrastructure sensors 50, a tower, a light pole, a building, a sign, among other fixed elements of the manufacturing environment 10. When the fixed tags 60 are disposed on the fixed infrastructure elements, the position coordinates associated with the fixed tags 60 may be defined during a calibration process. As an example, one of the fixed tags 60 is attached to a pole in the manufacturing environment 10, and an operator/computing system defines the position coordinate of the fixed tag 60 as the GNSS coordinates (or other location coordinate) of the pole during the calibration process. The calibration process may be repeated for each of the fixed tags 60 such that the each of the fixed tags are assigned to a particular set of defined GNSS coordinates.

In one form, the entity tags 70 include entity indicia (e.g., images and/or text) that uniquely identifies an entity within the manufacturing environment 10. As used herein, "entity" refers to an object (e.g., the autonomous devices 20, the workstations 30, the fixed robots 40, among other objects in the manufacturing environment 10) or location (e.g., area 100) within the manufacturing environment 10. As an example and as shown in FIG. 1, the entity tags 70 are disposed on each of the autonomous devices 20, the workstations 30, and the robots 40 to uniquely identify the respective system. Furthermore, multiple entity tags 70 are disposed in the area 100 to uniquely identify the area 100 and/or various subregions of the area 100.

In one form, the entity tags 70 are fiducial markers that uniquely identify the entity. As an example, the entity tags 70 are AprilTags and/or QR tags that each include a unique 2D barcode, and each 2D barcode is associated with a particular entity. In another example, the entity tags 70 are logo disposed at the entity. It should be understood that the entity tags 70 may be implemented by various others fiducial markers in other forms and are not limited to the examples described herein.

Figure 2:
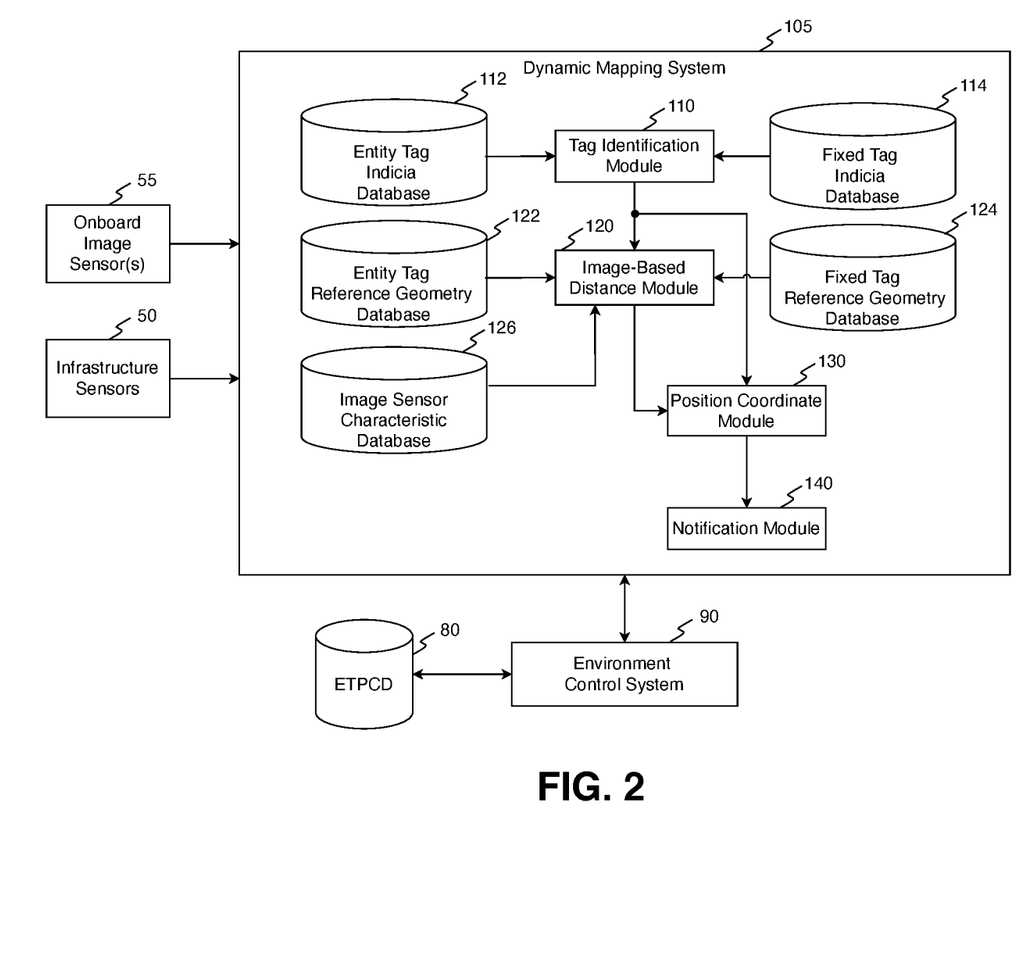
FIG. 2 is a functional block diagram of the autonomous systems in accordance with the teachings of the present disclosure.

With reference to FIG. 2, a block diagram of a dynamic mapping system 105 is shown and can be provided within the control systems 22, 32, 42 of the autonomous device 20, the workstation 30, and/or the fixed robot 40 and/or provided as an edge computing device (not shown). In some forms, the dynamic mapping system 105 includes a tag identification module 110, an entity tag indicia database 112, a fixed tag indicia database 114, an image-based distance module 120, an entity tag reference geometry database 122, a fixed tag reference geometry database 124, an image sensor characteristic database 126, a position coordinate module 130, and a notification module 140. It should be readily understood that any one of the components of the dynamic mapping system 105 can be provided at the same location or distributed at different locations and communicably coupled accordingly. While the entity tag indicia database 112, the fixed tag indicia database 114, the entity tag reference geometry database 122, the fixed tag reference geometry database 124, and/or the image sensor characteristic database 126 are illustrated as separate databases, it should be understood that any one of these databases may be selectively combined with another database in other forms.

In one form, the entity tag indicia database 112 stores a plurality of indicia-entity entries, where each indicia-entity entry identifies one of the entity tags 70 and provides the corresponding entity indicia and a respective entity associated with the entity tag 70. In one form, the fixed tag indicia database 114 stores a plurality of indicia-position coordinate entries, where each indicia-position coordinate entry provides fixed tag indicia of one of the fixed tags 60 and position coordinates associated with the fixed tag indicia.

In one form, the tag identification module 110 is configured to identify the position indicia of the fixed tags 60 based on the image data obtained from the image sensors 50 and/or 55 and the indicia-position coordinate entries of from the fixed tag indicia database 114. As an example, the tag identification module 110 employs known digital image recognition techniques to process the image data from the image sensors 50 and/or 55 and to determine the position indicia of the fixed tag 60. The tag identification module 110 then determines the position coordinate of the fixed tag based on the corresponding indicia-position coordinate entry from the fixed tag indicia database 114. Likewise, the tag identification module 110 is configured to identify the entity tags 70 and an entity associated with the entity tags 70 based on the entity indicia obtained from the image sensors 50 and/or 55 and the corresponding indicia-entity entry from the entity tag indicia database 112.

As an example, the image sensors 50 and/or 55 obtain image data of the fixed tag 60 and the entity tag 70, which may be AprilTags. The tag identification module 110 employs known digital image recognition techniques to decode the 2D barcode of the fixed tag 60 and the entity tag 70 and determine the position indicia of the fixed tag 60 and the entity associated with the entity tag 70, respectively.

As another example, the image sensors 50 and/or 55 obtain image data of the fixed tag 60, which may include text of the predefined position coordinate, and the entity tag 70, which may be an AprilTag. The tag identification module 110 employs known digital image recognition techniques to decode the text of the predefined position coordinate of the fixed tag 60 and to decode the 2D barcode of the entity tag 70 and the entity associated with the entity tag 70.

In one form, the entity tag reference geometry database 122 stores a plurality of geometry-entity tag entries, where each geometry-entity tag entry identifies one of the entity tags 70 and provides a respective set of reference geometries associated with the entity tag 70. In one form, the fixed tag reference geometry database 124 stores a plurality of geometry-fixed tag entries, where each geometry-fixed tag entry provides a respective set of reference geometries associated with the fixed tag 60. In some forms, the one or more reference geometries may include a reference size of the fixed tag 60 or entity tag 70 (e.g., a reference area, a reference width, a reference length, among others), a reference angle of the fixed tag 60 or entity tag 70 (e.g., a reference rotation angle along an axis with respect to a given axial plane), or a combination thereof (e.g., a reference skew).

In one form, the image sensor characteristic database 126 includes information indicating a pixel density, focal length, height, width, and/or geometry of the image sensors 50 and/or 55. It should be understood that the image sensor characteristic database 126 may include other characteristics of the image sensors 50 and/or 55 and is not limited to the characteristics described herein.

In one form, the image-based distance module 120 is configured to determine image-based distances for each of the identified fixed tags 60 and each of the identified entity tags 70. As an example, the image-based distance module 120 is configured to determine a first image-based distance between the onboard image sensor 55 and an identified fixed tag 60 and a second image-based distance between the onboard image sensor 55 and an identified entity tag 70. In some forms, the image-based distance module 120 may determine the first image-based distance and the second image-based distance based on characteristics of the onboard image sensor 55 and/or the infrastructure sensor 50 as indicated by the image sensor characteristic database 126. As an example, the image-based distance module 120 may determine the first image-based distance and the second image-based distance based on the focal length of the onboard image sensor 55 and/or the infrastructure sensor 50.

In one form, to determine the first image-based distance, the image-based distance module 120 may compare the identified fixed tag 60 to a respective geometry-fixed tag entry of the fixed tag reference geometry database 124. As an example, to determine the first image-based distance, the image-based distance module 120 may measure, based on the image data from the image sensors 50 and/or 55, a skew of the fixed tag 60. The image-based distance module 120 may compare the measured skew of the fixed tag 60 to a reference skew of the fixed tag 60 as indicated by the corresponding entry in the fixed tag reference geometry database 124. Based on the difference between the measured skew and the reference skew of the fixed tag 60 and the characteristics of the image sensors 50 and/or 55, the image-based distance module 120 determines the first image-based distance between the onboard sensors 55 and the identified fixed tag 60 (e.g., 33 meters).

Likewise, to determine the second image-based distance between the image sensors 50 and/or 55 and an identified entity tag 70, the image-based distance module 120 may compare a skew of the identified entity tag 70 and to a reference skew as indicated by the respective geometry-entity tag entry from the entity tag reference geometry database 122 (e.g., 7 meters). In some forms, the image-based distance module 120 may apply a known offset to the second image-based distance between the entity tag 70 and the image sensors 50 and/or 55 such that the second image-based distance represents a distance between a particular component/location of the corresponding entity (e.g., an end effector of a fixed robot 40 having the entity tag 70 disposed at another location of the fixed robot 40) and the image sensors 50 and/or 55.

In one form, the position coordinate module 130 is configured to determine the position coordinates of the identified entity tag 70 based on the position coordinates of the identified fixed tag 60 and/or at least one of the image-based distances. As an example, the position coordinate module 130 initially determines the position coordinate of the onboard image sensor 55 and/or a particular component of one of the autonomous device 20 and the workstation 30 in which the onboard image sensor 55 is disposed at. The position coordinate module 130 determines the position coordinate of the onboard image sensor 55 based on the predefined position coordinate of the fixed tag 60 (as determined by the tag identification module 110), the first image-based distance (e.g., 33 meters), and known distance to position coordinate conversion relations. If more than one image-based distance is determined for one or more identified fixed tags 60, the position coordinate module 130 may perform a triangulation routine to determine the position coordinate of the onboard image sensor 55 and/or a particular component of one of the autonomous device 20 and the workstation 30. Subsequently, the position coordinate module 130 determines the position coordinate of the identified entity tag 70 based on the determined position coordinate of the onboard image sensor 55, the second image-based distance between the onboard image sensor 55 and the entity tag 70, and known distance to position coordinate conversion relations.

In one form, the notification module 140 broadcasts the position coordinates of the identified entity tag 70 to the environment control system 90. Accordingly, the environment control system 90 updates a corresponding dynamic position entry in the ETPCD 80, where each dynamic position entry includes a current position coordinate of the entity tag 70 and/or the corresponding entity. As such, the position coordinates of each of the entity tags 70 stored in the ETPCD 80 are dynamically updated.

In one form, the environment control system 90 is configured to instruct the autonomous devices 20, the workstations 30, and other autonomous systems in the manufacturing environment 10 to autonomously travel based on the dynamic position entries stored in the ETPCD 80. As an example, the environment control system 90 defines paths for the autonomous devices 20 and the workstations 30 to travel along based on the dynamic position entries stored in the ETPCD 80. To define the paths, the environment control system 90 may perform known path planning routines, maneuver planning routines, and/or a trajectory planning routines.

In an example application and with reference to FIGS. 1-2, the autonomous device 20 autonomously travels within the manufacturing environment 10 and obtains, using the onboard image sensor 55, image data of the manufacturing environment 10. The image data includes an image of one of the fixed tags 60 and an entity tag 70 disposed on the workstation 30. The tag identification module 110 of the control system 22 identifies the position indicia of the fixed tag 60 to determine the corresponding predefined position coordinate and the entity indicia of the entity tag 70 to identify the workstation 30. The image-based distance module 120 of the control system 22 determines the image-based distances between the fixed tag 60 and the onboard image sensor 55 and between the entity tag 70 and the onboard image sensor 55. Based on the image-based distances and the characteristics of the onboard image sensor 55, the position coordinate module 130 determines the position of the entity tag 70 and/or the workstation 30. The notification module 140 of the control system 22 then broadcasts the determined position to the environment control system 90, which stores the updated position coordinate of the entity tag 70 and/or the workstation 30 in the ETPCD 80.

Figure 3:
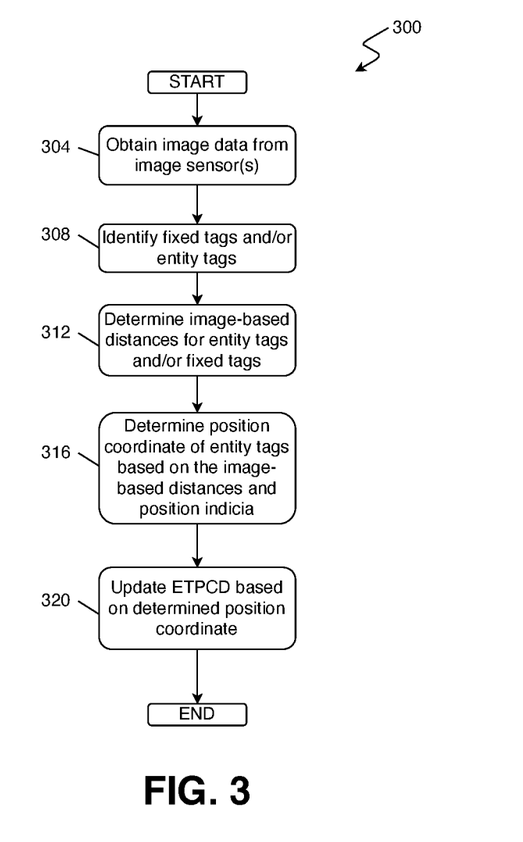
FIG. 3 illustrates an example control routine in accordance with the teachings of the present disclosure.

With reference to FIG. 3, a routine 300 for dynamically updating the position coordinates of the entity tags 70 is shown and performed by the dynamic mapping system 105 (i.e., the control system 22 of the autonomous device 20, the control system 32 of the workstation 30, or the control system 42 of the fixed robot 40). At 304, the dynamic mapping system 105 obtains the image data from the image sensors 50 and/or 55. At 308, the dynamic mapping system 105 identifies the fixed tags 60 and/or the entity tags 70 based on the position indicia and the entity indicia, respectively. At 312, the dynamic mapping system 105 determines the image-based distances for the fixed tags 60 and/or the entity tags 70 (i.e., the first image-based distance and the second image-based distance). At 316, the dynamic mapping system 105 determines the position coordinates of the entity tags 70 based on the image-based distances and the position indicia of the fixed tags 60. At 320, the environment control system 90 updates the ETPCD 80 based on the determined position coordinates of the entity tags 70 and then ends.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the terms "module", "control system", and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality, such as, but not limited to, movement drivers and systems, transceivers, routers, input/output interface hardware, among others; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A mapping system for an environment including an image sensor configured to generate image data of the environment, the mapping system comprising:
   a fixed tag including position indicia, wherein the position indicia identifies a predefined position coordinate of the fixed tag;
   an entity tag including entity indicia, wherein the entity indicia identifies an entity associated with the entity tag; and a controller configured to:
identify the position indicia of the fixed tag and the entity indicia of the entity tag based on the image data,
determine one or more image-based distances between the image sensor and at least one of the entity tag and the fixed tag, and
determine a position coordinate of the entity tag based on the one or more image-based distances and the predefined position coordinate of the fixed tag.

2. The mapping system of claim 1, wherein the fixed tag is disposed on a fixed object within the environment.

3. The mapping system of claim 1, wherein the entity tag is disposed on an object associated with the entity and the object is moveable within the environment.

4. The mapping system of claim 1, wherein the controller is further configured to:
determine a first image-based distance between the image sensor and the fixed tag based on the image data; and
determine a second image-based distance between the image sensor and the entity tag based on the image data, wherein:
the one or more image-based distances includes the first image-based distance and the second image-based distance, and
the position coordinate of the entity tag is further based on the first image-based distance, the second image-based distance, and the predefined position coordinate of the fixed tag.

5. The mapping system of claim 4, wherein:
the first image-based distance is determined based on a comparison of the fixed tag to one or more reference geometries of the fixed tag; and
the one or more reference geometries is a reference size of the fixed tag, a reference angle of the fixed tag, or a combination thereof.

6. The mapping system of claim 4, wherein:
the second image-based distance is determined based on a comparison of the entity tag to one or more reference geometries of the entity tag; and
the one or more reference geometries is a reference size of the entity tag, a reference angle of the entity tag, or a combination thereof.

7. The mapping system of claim 4, wherein the controller is further configured to determine the first image-based distance and the second image-based distance based on a pixel density of the image sensor, a focal length of the image sensor, a height of the image sensor, a width of the image sensor, a geometry of the image sensor, or a combination thereof.

8. The mapping system of claim 1, wherein the controller is further configured to broadcast the position coordinate of the entity tag to a database that stores the position coordinate corresponding to the entity tag to identify a location of the entity within the environment.

9. The mapping system of claim 1 further comprising a plurality of the fixed tags, wherein each fixed tag of the plurality of fixed tags identifies a unique predefined position coordinate, and wherein the plurality of fixed tags is distributed throughout the environment.

10. The mapping system of claim 1, wherein the fixed tag and the entity tag are fiducial markers.

11. The mapping system of claim 10, wherein the fixed tag is an AprilTag, and wherein the position indicia is a two-dimensional barcode.

12. The mapping system of claim 11, wherein the controller is further configured to decode the two-dimensional barcode to identify the predefined position coordinate of the AprilTag.

13. The mapping system of claim 10, wherein the entity tag is an AprilTag, and wherein the entity indicia is a two-dimensional barcode.

14. The mapping system of claim 1, wherein the image sensor is disposed on one of a fixed object and a moveable object within the environment.

15. A mapping method for mapping an environment, wherein the environment includes an image sensor configured to generate image data, and wherein the image data includes a fixed tag and an entity tag of the environment, the method comprising:
identifying position indicia of the fixed tag, wherein the position indicia identifies a predefined position coordinate of the fixed tag;
identifying entity indicia of the entity tag, wherein the entity indicia identifies an entity associated with the entity tag;
determining a first image-based distance between the image sensor and the fixed tag based on the image data;
determining a second image-based distance between the image sensor and the entity tag based on the image data; and
determining a position coordinate of the entity tag based on the predefined position coordinate of the fixed tag, the first image-based distance, and the second image-based distance.

16. The mapping method of claim 15, wherein:
the first image-based distance is determined based on a comparison of the fixed tag to one or more reference geometries of the fixed tag; and
the one or more reference geometries is a reference size of the fixed tag, a reference angle of the fixed tag, or a combination thereof.

17. The mapping method of claim 15, wherein:
the second image-based distance is determined based on a comparison of the entity tag to one or more reference geometries of the entity tag; and
the one or more reference geometries is a reference size of the entity tag, a reference angle of the entity tag, or a combination thereof.

18. A mapping method for mapping an environment, wherein the environment includes an image sensor configured to generate image data, and wherein the image data includes a fixed tag and an entity tag of the environment, the method comprising:
identifying position indicia of the fixed tag, wherein the position indicia identifies a predefined position coordinate of the fixed tag;
identifying entity indicia of the entity tag, wherein the entity indicia identifies an entity in the environment;
determining one or more image-based distances between the image sensor and at least one of the entity tag and the fixed tag; and
determining a position coordinate of the entity tag based on the one or more image-based distances and the predefined position coordinate of the fixed tag.

19. The mapping method of claim 18, wherein:
the one or more image-based distances includes a first image-based distance between the image sensor and the fixed tag;
the one or more image-based distances includes a second image-based distance between the image sensor and the entity tag; and the position coordinate of the entity tag is further based on the first image-based distance and the second image-based distance.

\* \* \* \* \*